United States Patent
Choi et al.

(10) Patent No.: US 6,610,872 B1
(45) Date of Patent: Aug. 26, 2003

(54) PROCESS FOR PREPARING POLYSILANE BY CATALYTIC DEHYDROGENATIVE CONDENSATION OF ORGANOSILANE AND METAL COMPLEX CATALYST THEREFOR

(75) Inventors: Nami Choi, Tsukuba (JP); Shun-ya Onozawa, Tsukuba (JP); Toshiyasu Sakakura, Tsukuba (JP); Masato Tanaka, Tsukuba (JP)

(73) Assignee: Director-General of Agency of Industrial Science and Technology (JP)

( * ) Notice: Subject to any disclaimer, the term of this patent is extended or adjusted under 35 U.S.C. 154(b) by 0 days.

(21) Appl. No.: 09/633,871

(22) Filed: Aug. 7, 2000

Related U.S. Application Data

(62) Division of application No. 09/410,750, filed on Oct. 1, 1999, now Pat. No. 6,140,448, which is a continuation of application No. 08/921,064, filed on Aug. 29, 1997, now abandoned.

(30) Foreign Application Priority Data

Aug. 29, 1996 (JP) ............................................. 8-227988

(51) Int. Cl.⁷ .............................. C08F 4/64; C07F 17/00
(52) U.S. Cl. ........................... 556/53; 556/54; 502/103; 502/152; 502/167
(58) Field of Search ...................... 556/53, 54; 502/103, 502/152, 167

(56) References Cited

U.S. PATENT DOCUMENTS

| 5,407,884 | A | | 4/1995 | Turner et al. ................ 502/155 |
|---|---|---|---|---|
| 5,523,435 | A | | 6/1996 | Lisowsky ..................... 556/11 |
| 5,527,929 | A | | 6/1996 | Timmers et al. ............... 556/7 |
| 5,541,272 | A | * | 7/1996 | Schmid et al. |
| 5,554,795 | A | | 9/1996 | Frey et al. ..................... 568/8 |
| 5,616,748 | A | | 4/1997 | Newman ..................... 556/11 |

OTHER PUBLICATIONS

Peter Jutzi et al., "Titanium and Zirconium Bent–Sandwich Complexes with the New [2–(Diisopropylamino)ethyl]cyclopentadieyl ligand:catalysts for the Polymerization of Ethylene and the Dehydrocoupling of Phenylsilane)", Ogranometallics, 15 (20), 4153–4161, 1996.*
Organometallics 1991, 10, 3430–3432.

* cited by examiner

Primary Examiner—Caixia Lu
(74) Attorney, Agent, or Firm—Lorusso, Loud & Kelly

(57) ABSTRACT

A polysilane is produced by subjecting a trihydrosilane to hydrogenative condensation in the presence of a titanium or zirconim complex catalyst having a first group selected from a dialkylaminoalkylcyclopentadienyl group, an α-[(dialkylamino)alkyl]indenyl group and a β-[(dialkylamino)alkyl]indenyl group and a second group selected from a cyclopentadienyl group and a pentamethylcyclopentadienyl group. The above dialkylaminoalkyl group may be replaced by a branched alkyl group. The zirconium complexes are novel compounds.

2 Claims, No Drawings

PROCESS FOR PREPARING POLYSILANE BY CATALYTIC DEHYDROGENATIVE CONDENSATION OF ORGANOSILANE AND METAL COMPLEX CATALYST THEREFOR

CROSS-REFERENCE TO RELATED APPLICATION

This application claims, under 35 USC 119, priority of Japanese Application Number 8-227988 filed Aug. 29, 1996.

BACKGROUND OF THE INVENTION

This invention relates to a process for preparing a polysilane by catalytic dehydrogenative condensation of an organo-trihydrosilane in the presence of an organotitanium or organozirconium complex catalyst. The present invention also pertains to a novel organozirconium complex catalyst.

Polysilanes are useful for application as an electrically conductive material, a luminescent material, a photoelectric conversion material, a nonlinear optical material, a photoresist material, a ceramic precursor, a polymerization initiator, etc.

One known process for the production of a polysilane includes subjecting an organo-trihydrosilane to dehydrogenative condensation in the presence of a ziroconocene silyl complex such as $Cp_2ZrMe_2$ (Organometallics, vol. 10, 3430–3432 (1991)). With this process, however, the weight average molecular weight of the polysilane is at most 5,000. To improve the polymerization degree, a method has been proposed in which a tri(perfluorophenyl)borane is added to the reaction system. Also known is a method in which hydrogen gas produced in situ is continuously removed from the reaction system. These methods, however, are not industrially advantageous. Furthermore, even with the above methods, the degree of polymerization is not high.

SUMMARY OF THE INVENTION

It is, therefore, an object of the present invention to provide a process which can produce a polysilane with a high degree of polymerization.

Another object of the present invention is to provide a zirconium complex catalyst which is useful for the production of a polysilane.

In accomplishing the above objects, there is provided in accordance with the present invention a zirconium complex represented by the following formula:

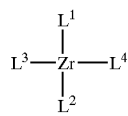

wherein $L^1$ represents a first group selected from the group consisting of (a) a dialkylaminoalkylcyclopentadienyl or branched alkylcyclopentadienyl group represented by the following formula (I):

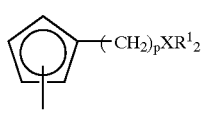
(I)

wherein $R^1$ stands for an alkyl group having no more than 3 carbon atoms, X stands for N or CH and p represents an integer of 4 or less, (b) an α-[(dialkylamino)alkyl]indenyl or branched alkylindenyl group represented by the following formula (II):

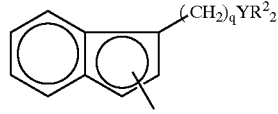
(II)

wherein $R^2$ stands for an alkyl group having no more than 3 carbon atoms, Y stands for N or CH and q represents an integer of 4 or less, and (c) a β-[(dialkylamino)alkyl]indenyl or branched alkylindenyl group represented by the following formula (III):

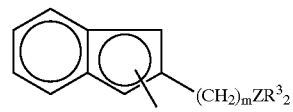
(III)

wherein $R^3$ stands for an alkyl group having no more than 3 carbon atoms, Z stands for N or CH and m represents an integer of 4 or less, $L^2$ represents a second group selected from the group consisting of (d) a cyclopentadienyl group represented by the formula (IV):

(IV)

and (e) a pentamethylcyclopentadienyl group represented by the formula (V):

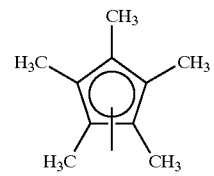
(V)

and $L^3$ and $L^4$ are each a monodendate anionic ligand.

In another aspect, the present invention provides a process for the production of a polysilane compound represented by the following formula (VII):

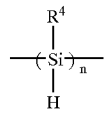
(VII)

wherein $R^4$ represents an alkyl group having no more than 12 carbon atoms, an aryl group having no more than 12 carbon atoms, a cycloalkyl group having no more than 12 carbon atoms or an aralkyl group having no more than 12 carbon atoms and n is an integer of at least 8, said process comprising subjecting a trihydrosilane represented by the following formula (VI):

$$R^4SiH_3 \qquad (VI)$$

wherein R⁴ is as defined above, to dehydrogenative condensation in the presence of a metal complex catalyst represented by the following formula (VIII):

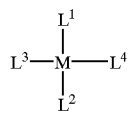

(VIII)

wherein M represents zirconium or titanium and $L^1$, $L^2$ $L^3$ and $L^4$ have the same meaning as above.

Other objects, features and advantages of the present invention will become apparent from the detailed description of the preferred embodiments of the invention to follow.

DETAILED DESCRIPTION OF THE PREFERRED EMBODIMENTS OF THE INVENTION

In the process according to the present invention, an organotrihydrosilane of the above formula (VI) is subjected to catalytic dehydrogenative condensation. In the formula (VI), the alkyl group $R^4$ may be, for example, phenyl, butyl, hexyl and β-phenylethyl.

The catalyst is a zirconium or titanium complex of the above formula (VIII). In the formula (I), $R^1$ is preferably methyl or ethyl and p is preferably 2 or 3. In the formula (II), $R^2$ is preferably methyl or ethyl and q is preferably 2 or 3. In the formula (III), $R^3$ is preferably methyl or ethyl and m is preferably 2 or 3. The catalyst is, used in a catalytically effective amount, generally 0.001 to 2 mol % based on the organotrihydrosilane of the formula (VI).

Each of the ligands represented by the formulas (I)–(V) is a cyclopentadienyl derivative. In the catalyst of the formula (VIII), $L^3$ and $L^4$ are preferably independently selected from the group consisting of an alkyl group, an aryl group, an alkenyl group, an alkoxy group, an aralkyl group and a halogen group. If desired, a halogen-containing catalyst, i.e. a catalyst of the formula (VIII) in which $L^3$ and $L^4$ are halogen atoms, may be treated with a reducing agent, such as triethylaluminum, alumoxane, butyllithium or methyllithium, before or during the hydrogenative condensation of the trihydrosilane.

The catalytic dehydrogenative condensation may be carried out with or without using a solvent. The solvent, when used, may be, for example, a hydrocarbon such as benzene, toluene or hexane, or an ether such as diethyl ether, dibutyl ether or tetrahydrofuran. The reaction temperature is generally 0–150° C., preferably from room temperature to 100° C. Too high a temperature in excess of 150° C. may cause the decomposition of the catalyst. A reaction temperature below 0° C. requires a long reaction time and is economically disadvantageous. It is advisable to perform the reaction in an atmosphere of an inert gas such as nitrogen, argon or methane. The polysilane may be separated from the reaction mixture by any known method such as florisil chromatography.

The following examples will further illustrate the present invention.

EXAMPLE 1

Preparation of [(N,N-Dimethylaminoethyl) cyclopentadienyl](pentamethylcyclopentadienyl) zirconium Dichloride A tetrahydrofuran (THF) solution (8 ml) containing 527 mg (3.84 mmol) of (N,N-dimethylaminoethyl) cyclopentadiene was cooled to 0° C., to which 2 ml of n-butyllithium were slowly added dropwise. The mixture was stirred for 30 minutes at 0° C. and the stirring was further continued for 1 hour at room temperature. The thus obtained THF solution containing a cyclopentadiethyllitthium derivative was added dropwise through about 10 minutes to a THF solution containing 1 g (3.01 mmol) of pentamethylcyclopentadienylzirconium trichloride at room temperature and the mixture was stirred overnight at room temperature. The solvent was then removed in vacuo and the residue was mixed with 20 ml of diethyl ether and filtered. The filtrate was mixed with 30 ml of pentane so that light yellow precipitates were formed. The precipitates were separated by filtration and washed several times with pentane. The amount of the yellow crystalline powder was 760 mg (yield: 58.0%). The physical properties of the product are as follows:

$^1$H NMR ($C_6D_6$): δ 1.79 (15H, s), 2.10 (6H, s), 2.43 (2H, t, J=7.2 Hz), 2.93 (2H, t, J=7.2 Hz), 5.63 (2H, t, J=2.6 Hz), 6.02 (2H, t, J=2.6 Hz); $^{13}$C NMR ($C_6D_6$): δ 12.3 (q), 28.8 (t), 45.4 (q), 60.3 (t), 112.4 (d), 111.7 (d), 123.8 (s), 133.8 (s); Elementary analysis; Calculated: C, 52.63; H, 6.73; N, 3.23 for $C_{19}H_{29}NCl_2Zr$; Found: C, 52.35; H, 6.91; N, 3.13.

EXAMPLE 2

Preparation of [(N,N-Dimethylaminopropyl) cyclopentadienyl](pentamethylcyclopentadienyl) zirconium Dichloride Example 1 was repeated in the same manner as described except that (N,N-dimethylaminopropyl)cyclopentadiene was substituted for (N,N-dimethylaminoethyl) cyclopentadiene. The yield was 55.0%. The physical properties of the product are as follows:

$^1$H NMR ($C_6D_6$): δ 1.80 (15H, s), 1.67–1.86 (2H, m), 2.07 (6H, s), 2.14 (2H, t, J=7.5 Hz), 2.78 (2H, t, J=7.5 Hz), 5.66 (2H, t, J=2.6 Hz), 5.96 (2H, t, J=2.6 Hz); $^{13}$C NMR ($C_6D_6$): δ 12.3 (q), 27.9 (t), 28.4 (t), 45.2 (q), 59.0 (t), 112.7 (d), 117.0 (d), 123.8 (s), 135.4 (s); Elementary analysis; Calculated: C, 53.67; H, 6.98; N, 3.13 for $C_{20}H_{31}NCl_2Zr$; Found: C, 53.69; H, 7.28; N, 3.11.

EXAMPLE 3

Preparation of [(N,N-Dimethylaminoethyl)indenyl] (pentamethylcyclopentadienyl)zirconium Dichloride Example 1 was repeated in the same manner as described except that 1(N,N-dimethylaminoindene was substituted for (N,N-dimethylaminoethyl)cyclopentadiene. The yield was 33.0%. The physical properties of the product are as follows:

$^1$H NMR ($C_6D_6$): δ 1.80 (15H, s), 2.12 (6H, s), 2.36–2.44 (2H, m), 2.93–2.96 (1H, m), 3.27–3.32 (1H, m), 5.63 (1H, d, J=2.9 Hz), 5.84 (1H, d, J=2.9 Hz), 7.06–7.25 (3H, m), 7.65 (1H, d, J=8.4 Hz); $^{13}$C NMR ($C_6D_6$): δ 12.4 (q), 27.3 (t), 45.5 (q), 57.8 (t), 96.8 (d), 113.9 (d), 115.5 (d), 123.8 (s), 123.9 (d), 125.3 (s), 125.6 (d), 127.1 (d), 129.3 (s), 131.2 (s).

EXAMPLE 4

Preparation of [1-(N,N-Dimethylaminopropyl) indenyl](pentamethylcyclopentadienyl)zirconium Dichloride Example 1 was repeated in the same manner as described except that 1(N,N-dimethylaminopropyl)indene was substituted for (N,N-dimethylaminoethyl)cyclopentadiene. The yield was 33.0%. The physical properties of the product are as follows:

$^1$H NMR (C$_6$D$_6$): δ 1.81 (15H, s), 1.60–1.78 (2H, m), 2.68 (6H, s), 2.04–2.13 (2H, m), 2.75–2.90 (1H, m), 3.15–3.30 (1H, m), 5.63 (1H, d, J=2.6 Hz), 5.77 (1H, d, J=2.6 Hz), 7.04–7.27 (3H, m), 7.68 (1H, d, J=8.3 Hz); $^{13}$C NMR (C$_6$D$_6$): δ 12.4 (q), 26.2 (t), 28.5 (t), 45.3 (q), 59.0 (t), 96.5 (d), 115.1 (d), 123.8 (s), 124.1 (d), 125.4 (d), 125.6 (d), 126.3 (s), 127.1 (d), 129.4 (s), 131.4 (s).

EXAMPLE 5

Preparation of [1-(N,N-Dimethylaminoethyl) indenyl](cyclopentadienyl)zirconium Dichloride Example 1 was repeated in the same manner as described except that 1(N,N-dimethylaminoethyl)indene was substituted for (N,N-dimethylaminoethyl)cyclopentadiene and that cyclopentadienylzirconium trichloride was substituted for pentamethylcyclopentadienylzirconium trichloride. The yield was 35.0%. The physical properties of the product are as follows:

$^1$H NMR (C$_6$D$_6$): δ 2.10 (6H, s), 2.38–2.56 (2H, m), 3.06–3.19 (2H, s), 5.77 (5H, s), 5.80 (1H, d, J=3.2 Hz), 6.61 (1H, d, J=3.2 Hz), 6.60–7.15 (3H, m), 7.49 (1H, d, J=8.3 Hz); $^{13}$C NMR (C$_6$D$_6$): δ 26.4 (t), 45.4 (q), 59.6 (t), 96.9 (d), 115.7 (s), 116.0 (d), 120.9 (s), 124.3 (d), 125.0 (d), 125.1 (d), 125.5 (d), 125.7 (d), 126.9.

EXAMPLE 6

Preparation of [1-(N,N-Dimethylaminopropyl) indenyl](cyclopentadienyl)zirconium Dichloride Example 1 was repeated in the same manner as described except that 1(N,N-dimethylaminopropyl)indene was substituted for (N,N-dimethylaminoethyl)cyclopentadiene and that cyclopentadienylzirconium trichloride was substituted for pentamethylcyclopentadienylzirconium trichloride. The yield was 40.0%. The physical properties of the product are as follows:

$^1$H NMR (C$_6$D$_6$): δ 1.68–1.80 (2H, s), 2.07 (6H, s), 2.10–2.17 (2H, m), 3.02–3.08 (2H, m), 5.75 (5H, s), 5.85 (1H, d, J=3.2 Hz), 6.47 (1H, d, J=3.2 Hz), 6.46–7.12 (3H, m), 7.51 (1H, d, J=8.2 Hz); $^{13}$C NMR (C$_6$D$_6$): δ 25.7 (t), 28.3 (q), 45.4 (q), 59.0 (t), 97.4 (d), 115.7 (s) 116.1 (d), 122.2 (s), 124.5 (d), 124.6 (d), 125.1 (d), 125.5 (d), 125.7 (d), 126.7 (s).

EXAMPLE 7

A mixture containing 10.0 mmol of phenylsilane, 0.5 ml of toluene, 0.01 mmol of [(N,N-dimethylaminoethyl) cyclopentadienyl](pentamethylcyclopentadienyl)zirconium dichloride (as catalyst) and two equivalents (based on the catalyst) of n-butyllithium was reacted at 30° C. for one week. The resulting reaction mixture was subjected to gel permeation chromatography to obtain a polymer having a weight average molecular weight of 10,700 on the basis of polystyrene. The $^1$H NMR analysis of the reaction mixture revealed that the weight ratio of the linear portion to the cyclic portion was 80:20. The $^{29}$Si NMR analysis revealed that the linear polymer had a substantially syndiotactic structure.

COMPARATIVE EXAMPLE 1

Example 7 was repeated in the same manner as described except that (cyclopentadienyl) (pentamethylcyclopentadienyl)zirconium dichloride was substituted for [(N,N-dimethylaminoethyl) cyclopentadienyl](pentamethylcyclopentadienyl)zirconium dichloride. The thus obtained polymer had a weight average molecular weight of 2,200 on the basis of polystyrene and a weight ratio of the linear portion to the cyclic portion of 74:26. The polymer was found to have an atactic structure and no regularity.

EXAMPLE 8

A mixture containing 10.0 mmol of phenylsilane, 0.5 ml of toluene, 0.05 mmol of [(N,N-dimethylaminoethyl)) cyclopentadienyl](pentamethylcyclopentadienyl)zirconium dichloride (as catalyst) and two equivalents (based on the catalyst) of n-butyllithium was reacted at 30° C. for 24 hours. The resulting reaction liquid was subjected to gel permeation chromatography to obtain a polymer having a weight average molecular weight of 5,890 on the basis of polystyrene. The $^1$H NMR analysis of the reaction mixture revealed that the weight ratio of the linear portion to the cyclic portion was 80:20. The $^{29}$Si NMR analysis revealed that the linear polymer had a substantially syndiotactic structure and the following physical properties.

$^1$H NMR (C$_6$D$_6$): δ 4.1–4.8 (1×0.8H), 4.8–5.1 (1×0.2H), 6.5–7.5 (5H).

EXAMPLE 9

A mixture containing 10.0 mmol of phenylsilane, 0.10 mmol of [(N,N-dimethylaminoethyl)cyclopentadienyl] (pentamethylcyclopentadienyl)zirconium dichloride (as catalyst) and two equivalents (based on the catalyst) of n-butyllithium was reacted at 30° C. for 5 hours under a reduced pressure of 10 mmHg. The resulting reaction mixture was subjected to gel permeation chromatography to obtain a polymer having a weight average molecular weight of 9,800 on the basis of polystyrene. The $^1$H NMR analysis of the reaction mixture revealed that the weight ratio of the linear portion to the cyclic portion was 70:30. The $^{29}$Si NMR analysis revealed that the linear polymer had a substantially syndiotactic structure.

EXAMPLE 10

A mixture containing 10.0 mmol of phenylsilane, 0.5 ml of toluene, 0.01 mmol of [(N,N-dimethylaminopropyl) cyclopentadienyl](pentamethylcyclopentadienyl)zirconium dichloride (as catalyst) and two equivalents (based on the catalyst) of n-butyllithium was reacted at 30° C. for one week. The resulting reaction mixture was subjected to gel permeation chromatography to obtain a polymer having a weight average molecular weight of 10,700 on the basis of polystyrene. The $^1$H NMR analysis of the reaction mixture revealed that the weight ratio of the linear portion to the cyclic portion was 80:20. The $^{29}$Si NMR analysis revealed that the linear polymer had a substantially syndiotactic structure.

EXAMPLE 11

A mixture containing 10.0 mmol of phenylsilane, 0.5 ml of toluene, 0.01 mmol of [(N,N-dimethylaminopropyl) cyclopentadienyl](pentamethylcyclopentadienyl)zirconium dichloride (as catalyst) and two equivalents (based on the catalyst) of n-butyllithium was reacted at 30° C. for one week. The resulting reaction mixture was subjected to gel permeation chromatography to obtain a polymer having a weight average molecular weight of 10,400 on the basis of polystyrene. The $^1$H NMR analysis of the reaction mixture revealed that the weight ratio of the linear portion to the cyclic portion was 80:20. The $^{29}$Si NMR analysis revealed that the linear polymer had a substantially syndiotactic structure.

EXAMPLE 12

A mixture containing 10.0 mmol of phenylsilane, 0.5 ml of toluene, 0.01 mmol of [(N,N-dimethylaminopropyl) indenyl](pentamethylcyclopentadienyl)zirconium dichloride (as catalyst) and two equivalents (based on the catalyst) of n-butyllithium was reacted at 30° C. for one week. The resulting reaction mixture was subjected to gel permeation chromatography to obtain a polymer having a weight average molecular weight of 2,260 on the basis of polystyrene. The $^1$H NMR analysis of the reaction mixture revealed that the weight ratio of the linear portion to the cyclic portion was 60:40. The $^{29}$Si NMR analysis revealed that the linear polymer had a substantially syndiotactic structure.

EXAMPLE 13

A mixture containing 10.0 mmol of phenylsilane, 0.5 ml of toluene; 0.05 mmol of 1[(N,N-dimethylaminopropyl) indenyl](pentamethylcyclopentadienyl)zirconium dichloride (as catalyst) and two equivalents (based on the catalyst) of n-butyllithium was reacted at 30° C. for one week. The resulting reaction mixture was subjected to gel permeation chromatography to obtain a polymer having a weight average molecular weight of 2,900 on the basis of polystyrene. The $^1$H NMR analysis of the reaction mixture revealed that the weight ratio of the linear portion to the cyclic portion was 52:48. The $^{29}$Si NMR analysis revealed that the linear polymer had a substantially syndiotactic structure.

EXAMPLE 14

A mixture containing 10.0 mmol of phenylsilane, 0.5 ml of toluene, 0.01 mmol of [(N,N-dimethylaminoethyl) cyclopentadienyl](cyclopentadienyl)zirconium dichloride (as catalyst) and two equivalents (based on the catalyst) of n-butyllithium was reacted at 30° C. for one week. The resulting reaction mixture was subjected to gel permeation chromatography to obtain a polymer having a weight average molecular weight of 7,500 on the basis of polystyrene. The $^1$H NMR analysis revealed that linear poly (phenylsilylene) was formed. The $^{29}$Si NMR analysis revealed that the linear polymer had a substantially atactic structure.

EXAMPLE 15

A mixture containing 10.0 mmol of phenylsilane, 0.5 ml of toluene, 0.01 mmol of [(N,N-dimethylaminopropyl) cyclopentadienyl](cyclopentadienyl)zirconium dichloride (as catalyst) and two equivalents (based on the catalyst) of n-butyllithium was reacted at 30° C. for one week. The resulting reaction mixture was subjected to gel permeation chromatography to obtain a polymer having a weight average molecular weight of 4,900 on the basis of polystyrene. The $^1$H NMR analysis revealed that linear poly (phenylsilylene) was formed. The $^{29}$Si NMR analysis revealed that the linear polymer had a substantially atactic structure.

EXAMPLE 16

A mixture containing 10.0 mmol of p-trifluoromethylphenylsilane, 0.5 ml of toluene, 0.01 mmol of [(N,N-dimethylaminoethyl)cyclopentadienyl] (cyclopentadienyl)zirconium dichloride (as catalyst) and two equivalents (based on the catalyst) of n-butyllithium was reacted at 30° C. for one week. The resulting reaction mixture was subjected to gel permeation chromatography to obtain a polymer having a weight average molecular weight of 4,900 on the basis of polystyrene. The $^1$H NMR analysis revealed that linear poly(phenylsilylene) was formed. The $^{29}$Si NMR analysis revealed that the linear polymer had a substantially atactic structure.

EXAMPLE 17

A mixture containing 10.0 mmol of n-butyllsilane, 0.5 ml of toluene, 0.01 mmol of [(N,N-dimethylaminoethyl) cyclopentadienyl](cyclopentadienyl)zirconium dichloride (as catalyst) and two equivalents (based on the catalyst) of n-butyllithium was reacted at 30° C. for one week. The resulting reaction mixture was subjected to gel permeation chromatography to obtain a polymer having a weight average molecular weight of 696 on the basis of polystyrene.

EXAMPLE 18

Preparation of [(2-Methylpropyl)cyclopentadienyl] (pentamethylcyclopentadienyl)zirconium Dichloride Example 12 was repeated in the same manner as described except that (2methylpropyl)cyclopentadiene was substituted for (N,N-dimethylaminoethyl)cyclopentadiene. The yield was 18.0%. The physical properties of the product are as follows:

$^1$H NMR (C$_6$D$_6$): δ 0.82 (6H, d, J=6.6 Hz), 1.66–1.73 (1H, m), 1.80 (15H, s), 2.63 (2H, d, J=7.0 Hz), 5.64 (2H, t, J=2.7 Hz), 5.92 (2H, t, J=2.7 Hz); $^{13}$C NMR (C$_6$D$_6$): δ 3 12.3 (q), 22.5 (q), 30.5 (d), 39.9 (t), 112.5 (d), 118.0.(d), 123.7 (s), 134.0 (s). Elementary analysis; Calculated: C, 54.52; H, 6.74 for C$_{19}$H$_{28}$Zr; Found: C, 54.65; H, 6.97.

EXAMPLE 19

Preparation of [(3-Methylbutyl)cyclopentadienyl] (pentamethylcyclopentadienyl)zirconium Dichloride Example 12 was repeated in the same manner as described except that (3-methylbutyl)cyclopentadiene was substituted for (N,N-dimethylaminoethyl)cyclopentadiene. The yield was 43.0%. The physical properties of the product are as follows:

$^1$H NMR (C$_6$D$_6$): δ 0.86 (6H, d, J=6.2 Hz), 1.40–1.50 (3H, m), 1.79 (15H, s), 2.76 (2H, t, J=7.8 Hz), 5.62 (2H, t, J=2.7 Hz), 5.93 (2H, t, J=2.7 Hz); $^{13}$C NMR (C$_6$D$_6$): δ 6 12.3 (q), 22.6 (q), 38.0 (d), 28.4 (t), 40.0 (t), 112.5 (d), 117.0 (d), 123.7 (s), 135.9 (s). Elementary analysis; Calculated: C, 55.53; H, 6.99 for C$_{20}$H$_{30}$Zr; Found: C, 54.96; H, 6.95.

EXAMPLE 20

A toluene solution (0.5 ml) containing 0.01 mmol of [(2methylpropyl)cyclopentadienyl] (pentamethylcyclopentadienyl)zirconium dichloride (as catalyst) was mixed with two equivalents (based on the catalyst) of n-butyllithium at 78° C. The mixture was heated to 30° C. and then mixed with 10.0 mmol of phenylsilane. The resulting mixture was reacted for one week under a nitrogen stream. The resulting reaction mixture was subjected to gel permeation chromatography to obtain a polymer having a weight average molecular weight of 9,040 on the basis of polystyrene. The $^1$H NMR analysis of the reaction mixture revealed that the weight ratio of the linear portion to the cyclic portion was 79:21. The $^{29}$Si NMR analysis revealed that the linear polymer had a substantially syndiotactic structure.

EXAMPLE 21

A toluene solution (0.5 ml) containing 0.01 mmol of [(3methylbutyl)cyclopentadienyl](pentamethylcyclopentadienyl)zirconium dichloride (as catalyst) was mixed with two equivalents (based on the catalyst) of n-butyllithium at 78° C. The mixture was heated to 30° C. and then mixed with 10.0 mmol of phenylsilane. The resulting mixture was reacted for one week under a nitrogen stream. The resulting reaction mixture was subjected to gel permeation chromatography to obtain a polymer having a weight average molecular weight of 8,960 on the basis of polystyrene. The $^1$H NMR analysis of the reaction mixture revealed that the weight ratio of the linear portion to the cyclic portion was 70:30. The $^{29}$Si NMR analysis revealed that the linear polymer had a substantially syndiotactic structure.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A zirconium complex represented by the following formula:

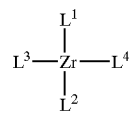

wherein $L^1$ represents a first group selected from the group consisting of:

(a) a group represented by the following formula (I):

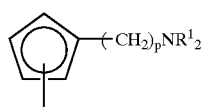

(I)

wherein $R^1$ stands for an alkyl group having no more than 3 carbon atoms, and p represents an integer of 2 or 3, (b) a group represented by the following formula (II):

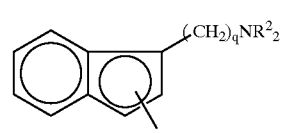

(II)

wherein $R^2$ stands for an alkyl group having no more than 3 carbon atoms, and q represents an integer of 2 or 3, and (c) a group represented by the following formula (III):

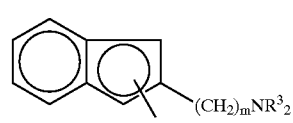

(III)

wherein $R^3$ stands for an alkyl group having no more than 3 carbon atoms, and m represents an integer of 1–4, $L^2$ represents a second group selected from the group consisting of:

(d) a cyclopentadienyl group represented by the formula (IV):

(IV)

and (e) a pentamethylcyclopentadienyl group represented by the formula (V):

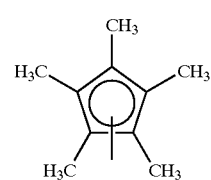

(V)

and each of $L^3$ and $L^4$ is chlorine.

2. A zirconium complex as claimed in claim 1, wherein each of the alkyl groups $R^1$, $R^2$ and $R^3$ is methyl or ethyl and each of the integers p, q and m is 2 or 3.

* * * * *

UNITED STATES PATENT AND TRADEMARK OFFICE
CERTIFICATE OF CORRECTION

PATENT NO. : 6,610,872 B1
DATED : August 26, 2003
INVENTOR(S) : Choi et al.

It is certified that error appears in the above-identified patent and that said Letters Patent is hereby corrected as shown below:

Title page,
Item [56], References Cited, U.S. PATENT DOCUMENTS,
"U.S. 5,541,272 A    7/1996    Schmid et al" should read
-- U.S. 5,541,272 A    7/1996    Schmid et al..........526/160 --.

Column 5,
Line 28, "126.9" should read -- 126.9 (s) --.

Column 8,
Line 49, "§ 6 12.3" should read -- § 12.3 --; and
Line 59, "78°C" should read -- -78°C --.

Column 9,
Line 10, "78°C" should read -- 78°C --.

Signed and Sealed this

Fourteenth Day of December, 2004

JON W. DUDAS
*Director of the United States Patent and Trademark Office*